United States Patent
Liao et al.

(10) Patent No.: US 9,581,456 B2
(45) Date of Patent: Feb. 28, 2017

(54) DETERMINING AN ESTIMATED TIME OF ARRIVAL OF A VEHICLE AT AN ENDPOINT OF A JOURNEY

(71) Applicant: TOYOTA JIDOSHA KABUSHIKI KAISHA, Toyota-shi, Aichi-ken (JP)

(72) Inventors: Jackie Liao, Pacifica, CA (US); Roger Melen, Los Altos Hills, CA (US); Vinuth Rai, San Jose, CA (US); Hidenobu Suzuki, Miyoshi (JP); Toshiyuki Namba, Nisshin (JP)

( * ) Notice: Subject to any disclaimer, the term of this patent is extended or adjusted under 35 U.S.C. 154(b) by 111 days.

(21) Appl. No.: 14/604,391

(22) Filed: Jan. 23, 2015

(65) Prior Publication Data
US 2016/0216123 A1    Jul. 28, 2016

(51) Int. Cl.
| | | |
|---|---|---|
| G05B 13/02 | (2006.01) | |
| G01C 21/34 | (2006.01) | |
| G01C 21/36 | (2006.01) | |
| G06Q 10/10 | (2012.01) | |
| H04M 1/725 | (2006.01) | |

(52) U.S. Cl.
CPC ....... *G01C 21/3484* (2013.01); *G01C 21/362* (2013.01); *G05B 13/02* (2013.01); *G06Q 10/109* (2013.01); *H04M 1/72572* (2013.01)

(58) Field of Classification Search
None
See application file for complete search history.

(56) References Cited

U.S. PATENT DOCUMENTS

| | | | | |
|---|---|---|---|---|
| 9,140,570 B1* | 9/2015 | Baird | ................. | G01C 21/3446 |
| 2011/0231091 A1* | 9/2011 | Gourlay | ........... | G08G 1/096811 |
| | | | | 701/465 |
| 2014/0006137 A1 | 1/2014 | Melen et al. | | |
| 2014/0309849 A1* | 10/2014 | Ricci | ....................... | B60Q 1/00 |
| | | | | 701/33.4 |
| 2014/0309893 A1* | 10/2014 | Ricci | ..................... | H04W 48/04 |
| | | | | 701/49 |
| 2015/0084750 A1* | 3/2015 | Fitzgibbon | ................. | G01S 5/14 |
| | | | | 340/12.29 |
| 2015/0247646 A1* | 9/2015 | Song | ....................... | F24F 11/006 |
| | | | | 700/276 |
| 2015/0354978 A1* | 12/2015 | Gerlach | ............. | G01C 21/3617 |
| | | | | 701/424 |

FOREIGN PATENT DOCUMENTS

| | | |
|---|---|---|
| CN | 203267993 U | 11/2013 |
| JP | 2002267487 A | 9/2002 |
| JP | 2014003391 A | 1/2014 |
| JP | 2014175698 A | 9/2014 |

* cited by examiner

*Primary Examiner* — Jelani Smith
*Assistant Examiner* — Genna Mott
(74) *Attorney, Agent, or Firm* — Burbage Law, P.C.; Elizabeth Ruzich; Jon-Michael Burbage (57) ABSTRACT

The disclosure includes a system and method for determining a current location of a user at a current time. The method may include determining journey data associated with one or more of the user, the current location, and the current time, where journey data describes one or more historical journeys of the user. The method may include determining, based on the journey data, an estimated time of arrival (ETA) describing an arrival estimate of when the user and a vehicle will arrive at an endpoint of a journey; and transmitting the ETA to a network.

27 Claims, 6 Drawing Sheets

DETERMINING AN ESTIMATED TIME OF ARRIVAL OF A VEHICLE AT AN ENDPOINT OF A JOURNEY

BACKGROUND

The specification relates to determining an estimated time of arrival of a vehicle at an endpoint of a journey.

Operations may be scheduled in a home based on when people are present. For example, utility costs can be reduced by setting a timer for an air conditioner to run after 6 p.m. when people are home from work. Setting a timer may not be ideal, however, when people have inconsistent schedules. As an example, a particular person might get home at 6 p.m. on Monday, have Tuesday off, get home at 3 p.m. on Wednesday, etc.

Some home management systems allow a user to instruct the systems to perform operations by accessing a program on a mobile device. However, the user may forget to use the program at the right time or may forget to use the program at all.

SUMMARY

According to one innovative aspect of the subject matter described in this disclosure, a system and method for determining a current location of a user at a current time may include determining journey data associated with one or more of the following: the user; the current location; and the current time of the user. The journey data may describe one or more historical journeys of the user. The method may include determining, based on the journey data, an estimated time of arrival (ETA) describing an arrival estimate of when the user and a vehicle will arrive at an endpoint of a journey and transmitting the ETA to a network.

Other aspects include corresponding methods, systems, apparatus, and computer program products.

The subject matter of this disclosure may be described from the viewpoint of various entities. For example, the subject matter may be described from the viewpoint of a client or a server. The server may include various entities. For example, in some implementations the client may include one or more of the following: a vehicle; a mobile client device; and a management device associated with an endpoint.

The management device associated with the endpoint may receive data from a network. In general, yet another innovative aspect of the subject matter described in this disclosure may be embodied in methods that include: receiving an ETA corresponding to an endpoint of a journey and an estimated time of departure (ETD) from the endpoint, the ETA and the ETD corresponding to a user and a vehicle associated with the journey. The method may also include determining, based on the ETA, the ETD, and user preferences associated with the user, one or more operations to perform at the endpoint. The method may also include modifying one or more settings for the one or more operations based on a utility preference.

These and other implementations may each optionally include one or more of the following operations and features. For instance, the operations further include: determining, based on the journey data, an ETD describing a departure estimate of when the user will depart from the endpoint of the journey and transmitting the ETD to the network; determining driving data describing one or more driving conditions that occur between the current location of the user and the endpoint of the journey, determining whether the driving data will alter the ETA or the ETD by a relevant amount, and responsive to the driving data altering the ETA or the ETD by the relevant amount, transmitting a revised ETA or a revised ETD to the network; determining user data describing information associated with the user, determining whether the user data will alter the ETA or the ETD, and responsive to the user data altering the ETA or the ETD, transmitting a revised ETA or a revised ETD to the network; transmitting the current location to the user of the network; determining a state of mind associated with the user and transmitting the state of mind to the network; receiving sensor data from sensors in the vehicle, determining vehicle conditions based on the sensor data, and transmitting the vehicle conditions to the network, where the network provides the vehicle conditions to the management application to determine operations to create endpoint conditions that are similar to the vehicle conditions; generating a score that indicates a likelihood that the user is arriving at the endpoint based on the current location and a comparison of the current location and the current time to journey data; responsive to the score exceeding a predetermined threshold, transmitting a communication to a management device that indicates that the endpoint for the journey is a home associated with the management device; and generating the journey data by recording the user's location over a period of time.

For instance, the features further include: the driving data being based on at least one of traffic, weather conditions, and an indication that the endpoint of the journey has changed; the endpoint being a home associated with the user; the current location of the user being determined based on location data being wirelessly received from a mobile device; and the mobile device being selected from a group consisting of a smartphone, a smartwatch, a fitness tracker, a tablet computer, a personal computer, a laptop, and a personal data assistant.

The disclosure is particularly advantageous in a number of respects. For example, the management application may use the ETA to determine one or more operations to perform at an endpoint. As a result, the endpoint may be modified to maximize a comfort level for a user. In addition, the management application may use the ETA to reduce a cost of needlessly running operations at the endpoint during times when the user is not present or is not expected to stay at the endpoint for long enough to justify the expense of performing the operations. As a result, the management application may cause an overall reduction in energy consumption by determining an ETA of a user and a vehicle.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Example System Overview

Figure 1:
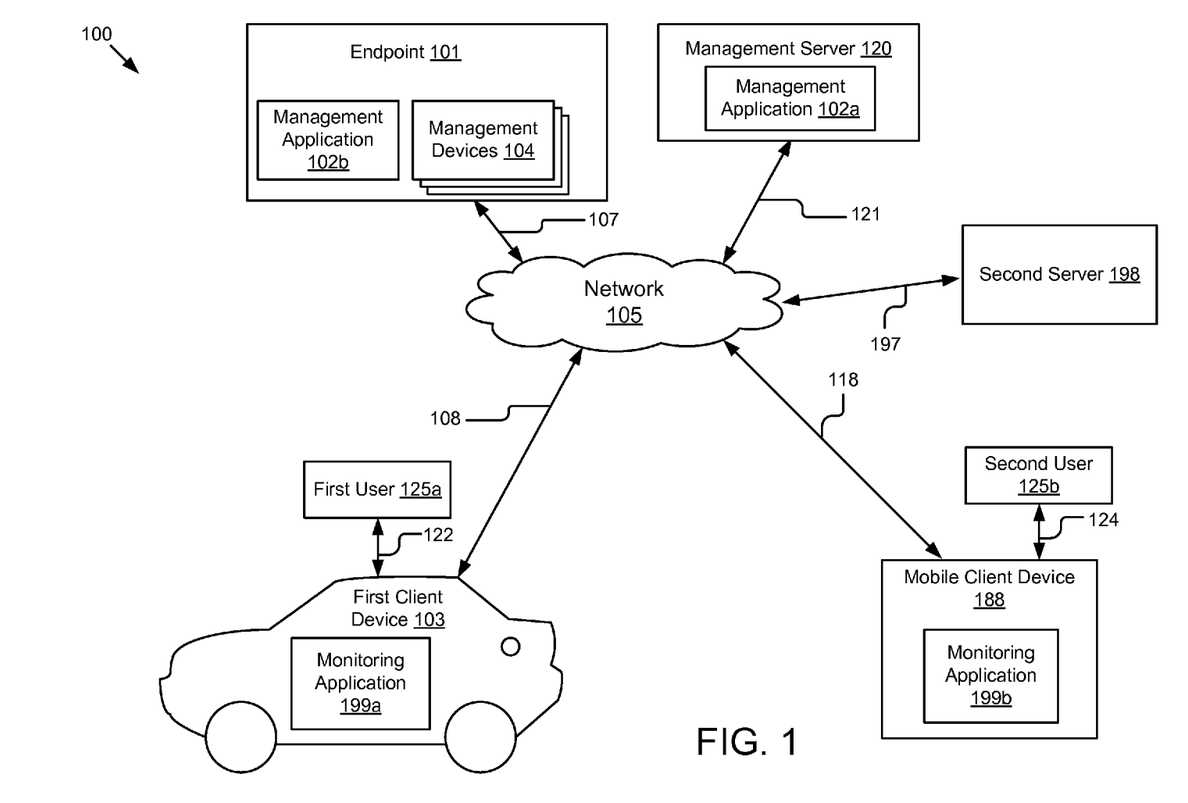
FIG. 1 is a block diagram illustrating an example monitoring system for determining an estimated time of arrival (ETA) of a vehicle at an endpoint of a journey.

FIG. 1 is a block diagram illustrating an example system 100 for determining an estimated time of arrival (ETA) of a vehicle at an endpoint of a journey. The system 100 includes a first client device 103, a mobile client device 188, a management server 120, an endpoint 101, and a second server 198. The first client device 103 and the mobile client device 188 can be accessed by users 125a and 125b (also referred to herein individually and collectively as "user 125"), via signal lines 122 and 124, respectively. In the illustrated example, these entities of the system 100 may be communicatively coupled via a network 105.

The first client device 103 and the mobile client device 188 in FIG. 1 can be used by way of example. While FIG. 1 illustrates two client devices 103 and 188, the disclosure applies to a system architecture having one or more client devices 103, 188. Furthermore, although FIG. 1 illustrates one network 105 coupled to the first client device 103, the mobile client device 188, the endpoint 101, and the second server 198, in practice one or more networks 105 can be connected. While FIG. 1 includes one endpoint 101, one management server 120, and one second server 198, the system 100 could include one or more endpoints 101, one or more management servers 120, and one or more second servers 198.

The network 105 can include a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some implementations, the network 105 may include a peer-to-peer network. The network 105 may also be coupled to or include portions of a telecommunications network for sending data in a variety of different communication protocols. In some implementations, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, etc. In some implementations, the network 105 may include a global positioning system (GPS) satellite for providing GPS navigation to the first client device 103 or the mobile client device 188. The network 105 may include a mobile data network for example, 3G, 4G, long-term evolution (LTE), Voice-over-LTE ("VoLTE"), or other mobile data network or combination of mobile data networks.

In some implementations, the monitoring application 199a can be operable on the first client device 103. The first client device 103 can include a mobile client device with a battery system. For example, the first client device 103 can include one of a vehicle (e.g., an automobile, a bus, an airplane, a boat), or other mobile system including non-transitory computer electronics and a battery system. The vehicle may be an electric vehicle, a hybrid vehicle, or a vehicle that includes an internal combustion engine. In some implementations, the first client device 103 may include a computing device that includes a memory and a processor.

In the illustrated example, the first client device 103 is communicatively coupled to the network 105 via signal line 108.

In some implementations, a monitoring application 199b can be operable on the mobile client device 188. The mobile client device 188 may include a portable computing device that includes a memory and a processor, for example, a removable in-dash device, a smartphone, a smartwatch, a fitness tracker, a tablet computer, a personal computer, a laptop, a personal digital assistant (PDA), a mobile telephone, a mobile e-mail device, a portable game player, a portable music player, or other portable electronic device capable of accessing the network 105. The monitoring applications 199a and 199b may be referred to herein individually and collectively as "monitoring application 199." In some implementations, the monitoring application 199 may act in part as a thin-client application that may be stored on the first client device 103 and in part as components that may be stored on the mobile client device 188. In the illustrated example, the mobile client device 188 is communicatively coupled to the network 105 via signal line 118.

In some implementations, the first user 125a and the second user 125b can be the same user 125 interacting with both the first client device 103 and the mobile client device 188. For example, the user 125 can be a driver sitting in the first client device 103 (e.g., a vehicle) and operating the mobile client device 188 (e.g., a smartwatch). In some other implementations, the first user 125a and the second user 125b may be different users 125 that interact with the first client device 103 and the mobile client device 188, respectively. For example, the first user 125a could be a driver that drives the first client device 103 and the second user 125b could be a passenger that interacts with the mobile client device 188.

The monitoring application 199 can be code and routines for determining an ETA of a vehicle at an endpoint 101 of a journey. The monitoring application 199 determines a current location of a user at a current time. For example, the monitoring application 199 determines the current location of the user from the current location of a vehicle that the user is driving. The monitoring application 199 determines journey data associated with one or more of the user, the current location, and the current time. The journey data describes one or more historical journeys of the user. For example, the journey data for the user may be based on recording the user's location over a period of time. Determining the journey data associated with the current location may include determining whether the current location is associated with one or more journeys traveled by the user. Determining the journey data associated with the current time may include determining whether the current time is associated with one or more journeys traveled by the user.

The monitoring application 199 determines the ETA that describes an arrival estimate of when the user and a vehicle will arrive at an endpoint 101 of a journey. For example, the monitoring application 199 determines, based on how long it historically takes the user to arrive at the endpoint 101 and current traffic conditions, that it will take 23 minutes for the user and the vehicle to arrive at the endpoint 101. The monitoring application 199 transmits the ETA to the network 105. The network 105 may transmit the ETA to an endpoint 101 or a second server 198.

In some implementations, the monitoring application 199 can be implemented using hardware including a field-programmable gate array ("FPGA") or an application-specific integrated circuit ("ASIC"). In some other implementations, the monitoring application 199 can be implemented using a combination of hardware and software. The monitoring application 199 may be stored in a combination of the devices and servers, or in one of the devices or servers. The monitoring application 199 may include code and routines configured to perform one or more steps of the methods 400, 500 of FIGS. 4 and 5 when executed by a processor, such as processor 225, described below with reference to FIG. 2.

In some implementations, a management application 102*a* can be operable on the management server 120. The management server 120 can include a hardware server that includes a processor, a memory, and network communication capabilities. In the illustrated example, the management server 120 is coupled to the network 105 via signal line 121. The management server 120 sends and receives data to and from other entities of the system 100 via the network 105. The management server 120 receives information from the monitoring application 199 and may store an application program interface (API) in the cloud that determines code and routines for interacting with the management devices 104.

In some implementations, the management application 102*b* can be operable at an endpoint 101. The endpoint 101 can include management devices 104 that may receive instructions from the management application 102*b*. In the illustrated example, the endpoint 101 is coupled to the network 105 via signal line 107. The endpoint 101 sends and receives data to and from other entities of the system 100 via the network 105.

The endpoint 101 is a location that is visited by the user. For example, the endpoint 101 is a user's home or work. The endpoint 101 may be any location with management devices 104, for example, a restaurant, a hospital, a library, etc. The management devices 104 include a processor, a memory, and network communication capabilities. For example, the management devices 104 may include a thermostat, an oven, a boiler, a rice cooker, a yogurt maker, a coffee maker, a water heater (e.g. for making tea), a home security system, a lighting system, a stereo system, an entertainment system, and a garage door opener. Although the endpoint 101 is illustrated as having multiple management devices 104, the endpoint 101 may include only one management device 104.

The management applications 102*a* and 102*b* may be referred to herein individually and collectively as "management application 102." The management application 102 may be configured to receive, from the monitoring application 199, an ETA at the endpoint 101 of a journey and an estimated time of departure (ETD) from the endpoint, the ETA and the ETD corresponding to the user and a vehicle associated with the journey. The management application 102 may determine, based on the ETA, the ETD, and user preferences associated with the user, one or more operations to perform at the endpoint 101. For example, the management application 102 may determine that the ETA is sixty minutes, and the ETD is 12 hours. The management application 102 may determine that the user would like to eat dinner and, as a result, determine that one of the operations should be to turn on a rice cooker and the heat.

The management application 102 may modify one or more settings for the one or more operations based on a utility preference. For example, the utility preference may include a preference for minimizing energy costs. As a result, the setting for the heater may be based on maximizing energy costs. In some implementations where the management application 102 is stored on the management server 120, the management application 102 may transmit the determined operations and the modified setting to the endpoint 101. In some other implementations where the management application 102 is stored on the endpoint 101, the management application 102 may be communicatively coupled to the management devices 104 to instruct the management devices 104 to perform the determined operations.

In some implementations, the management application 102 can be implemented using hardware including a field-programmable gate array ("FPGA") or an application-specific integrated circuit ("ASIC"). In some other implementations, the management application 102 can be implemented using a combination of hardware and software. The management application 102 may be stored in a combination of the devices and servers, or in one of the devices or servers. The management application 102 may include code and routines configured to perform one or more steps of the method 600 of FIG. 6 when executed by a processor.

The second server 198 can include a server that provides data to the first client device 103, the mobile client device 188, or the monitoring application 199. The second server 198 can include an infotainment server for providing infotainment, a music server for providing streaming music services, a social network server for providing social network data, a traffic server for providing traffic data, a map server for providing map data, a weather server for providing weather data, a power service server for providing power usage service (e.g., billing service), or a health server for providing health information. The second server 198 is coupled to the network 105 via signal line 197.

The second server 198 may host and/or generate websites that provide one or more of the following network services: navigation instructions; streaming audio or video (for example, Pandora™, Spotify™, iTunes™, Google Play™, YouTube™, Netflix™, Hulu Plus™, Crackle™, Amazon™ Instant Video, Prime Instant Video, Digital Music Store, Prime Music App Store, etc.); microblogging (for example, Twitter™, Tumblr™, etc.); online social networking (for example, Facebook™, Google+™, LinkedIn™, Tinder™, or QQ™, etc.); online chatting (for example, Google Chat™, Snapchat™, WhatsApp™, etc.); online content sharing (for example, Instagram™, Pinterest™, etc.); e-mail (for example, Gmail™, Outlook™, Yahoo! Mail™, etc.); file sharing (for example, Dropbox™, Google Drive™, MS OneDrive™, Evernote™, etc.); electronic calendar and scheduling (for example, Google™ Calendar, MS Outlook™, etc.); and health data sharing (for example, Fitbit™, Jawbone™, Nike+ Fuelband, etc.). In some implementations, a user may consume one or more of these network services via an infotainment system of the vehicle.

Example Monitoring Application

Figure 2:
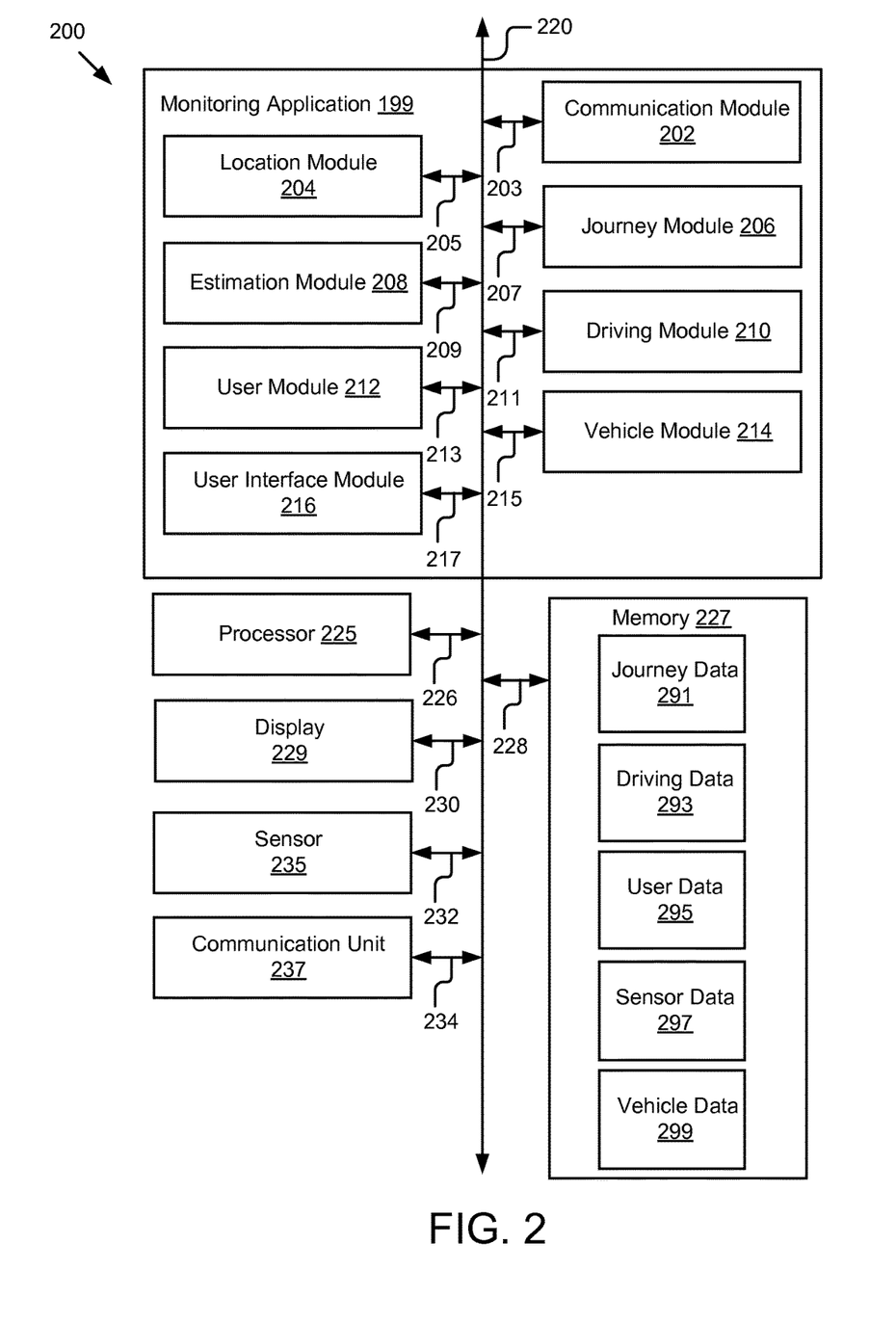
FIG. 2 is a block diagram illustrating an example monitoring device.

FIG. 2 is a block diagram illustrating an example monitoring device 200. The monitoring device 200 can be, or include, or be included in the first client device 103 or the mobile client device 188 of FIG. 1. In some implementations, the monitoring device 200 may include a special-purpose computing device configured to provide some or all of the functionality described below with reference to FIG. 2.

FIG. 2 can include the monitoring application 199, a processor 225, a memory 227, a display 229, a sensor 235, and a communication unit 237. The components of the monitoring device 200 are communicatively coupled by a bus 220.

The processor 225 includes an arithmetic logic unit, a microprocessor, a general-purpose controller, or some other processor array to perform computations and provide electronic display signals to a display device. The processor 225 processes data signals and may include various computing architectures including a complex instruction set computer (CISC) architecture, a reduced instruction set computer (RISC) architecture, or an architecture implementing a combination of instruction sets. Although FIG. 2 includes a single processor 225, multiple processors 225 may be included. Other processors, operating systems, sensors, displays, and physical configurations may be possible. The processor 225 is coupled to the bus 220 for communication with the other components via signal line 226.

The memory 227 stores instructions or data that may be executed by the processor 225. The instructions or data may include code for performing the techniques described herein. The memory 227 may include a dynamic random access memory (DRAM) device, a static random access memory (SRAM) device, flash memory, or some other memory device. In some implementations, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The memory 227 is coupled to the bus 220 for communication with the other components via signal line 228.

As illustrated in FIG. 2, the memory 227 stores journey data 291, driving data 293, user data 295, sensor data 297, and vehicle data 299.

The journey data 291 includes information about the user's historical journeys, such as start points, destinations, durations, journeys associated with historical journeys, etc. For example, the journey data 291 could include a log of all locations visited by the first client device 103, all locations visited by the user 125 (e.g., locations associated with both the first client device 103 and the mobile client device 188), and all locations requested by the user 125. The log may also include times associated with the historical journeys, for example, a time that a user traveled at various points or requested information about a location. The monitoring application 199 uses the journey data 291 to determine the journey that the user takes to travel to the endpoint.

The driving data 293 includes information about driving conditions that occur during a journey. For example, driving data 293 includes traffic, such as a speed of travel, locations of accidents, locations of speed traps, etc. Driving data 293 may also include weather conditions, such as temperature, an existence of precipitation, wind speeds, etc. In some embodiments, driving data 293 is supplemented by information from the second server 198. The monitoring application 199 uses the driving data 293 to determine the driving conditions for the journey to determine whether the driving conditions will affect the ETA. In some implementations, the driving data 293 includes indications that the endpoint 101 is different from the endpoint 101 determined by monitoring application 199 for a journey.

The user data 295 includes information about users. For example, the user data 295 may include registration information for a user such as a unique identifier for a user, a username, a password; information about the user's preferences; information about calendar data associated with the user, such as time and location of appointments, etc. The monitoring application 199 uses the user data 295 to determine the ETA for the user.

The sensor data 297 includes information about sensor readings associated with the first client device 103. For example, the sensor data 297 includes sensor readings recorded at a particular time period. The monitoring application 199 uses the sensor data 297 to determine vehicle conditions that the user might enjoy at the endpoint. For example, the monitoring application 199 determines an internal temperature in the vehicle to identify a temperature that the user might enjoy at the endpoint. The monitoring application 199 stores information about the vehicle conditions as vehicle data 299.

The display 229 can include hardware for displaying graphical data from the monitoring application 199. For example, the display 229 renders graphics for displaying a user interface that displays driving directions, calendar information, and settings. The display 229 is coupled to the bus 220 via signal line 230.

The sensor 235 can include a device that provides sensor data 297 about the vehicle. The sensor 235 may be communicatively coupled to an onboard computer of a vehicle. The sensor 235 may include an infrared detector, a motion detector, a thermostat, a microphone, a speaker, etc. For example, the first client device 103 may include sensors for measuring one or more of a current time, a location (e.g., a latitude, longitude, and altitude of a location), an acceleration of a vehicle, a velocity of a vehicle, a fuel tank level of a vehicle, a battery level of a vehicle, etc. Alternatively or additionally, the sensor 235 can include a component or module of another system or device (e.g., radio, infotainment system, thermostat) that reports a status of the system or device to the monitoring device 200. The sensor 235 is coupled to the bus 220 via signal line 232.

In some implementations, the sensor 235 includes hardware for performing location detection, for example, a global positioning system (GPS), location detection through triangulation via a wireless network, etc. The sensor 235 provides information about at least one of a temperature inside the vehicle, a temperature outside the vehicle, a position of the seats, a radio station, an audio program, a window level, a level of illumination of car lights, a speed of windshield wipers, and other settings associated with the vehicle and/or any system, subsystem, or device included in or communicatively coupled to the vehicle.

The communication unit 237 can include hardware that transmits and receives data to and from at least one of the first client device 103 and the mobile client device 188, depending upon where the monitoring application 199 is stored. The communication unit 237 is coupled to the bus 220 via signal line 234. In some implementations, the communication unit 237 includes a port for direct physical connection to the network 105 or to another communication channel. For example, the communication unit 237 includes a USB, SD, CAT-5, or similar port for wired communication with the first client device 103. In some implementations, the communication unit 237 includes a wireless transceiver for exchanging data with the first client device 103 or other communication channels using one or more wireless communication methods, including IEEE 802.11, IEEE 802.16, Bluetooth®, or another suitable wireless communication method.

In some implementations, the communication unit 237 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 237 includes a wired port and a wireless transceiver. The communication unit 237 also provides other conventional connections to the network 105 for distribution of files or media objects using standard network protocols including TCP/IP, HTTP, HTTPS, and SMTP, etc.

In some implementations, the monitoring application 199 includes a communication module 202, a location module 204, a journey module 206, an estimation module 208, a driving module 210, a user module 212, a vehicle module 214, and a user interface module 216.

The communication module 202 can include code and routines for handling communications between the monitoring application 199 and other components of the monitoring device 200. In some implementations, the communication module 202 can include a set of instructions executable by the processor 225 to provide the functionality described below for handling communications between the monitoring application 199 and other components of the monitoring device 200. In some implementations, the communication module 202 can be stored in the memory 227 of the monitoring device 200 and can be accessible and executable by the processor 225.

The communication module 202 sends and receives data, via the communication unit 237, to and from one or more of the first client device 103, the mobile client device 188, the endpoint 101, and the second server 198 depending upon where the monitoring application 199 may be stored. For example, the communication module 202 receives, via the communication unit 237, traffic information from the second server 198. The communication module 202 sends information about the traffic information to the driving module 210 for generating driving data 293. The communication module 202 is coupled to the bus 220 via signal line 203.

In some implementations, the communication module 202 receives data from components of the monitoring application 199 and stores the data in the memory 227. For example, the communication module 202 receives data from the sensors 235, and stores it as sensor data 297 in the memory 227 as determined by the vehicle module 214.

In some implementations, the communication module 202 may handle communications between components of the monitoring application 199. For example, the communication module 202 receives journey data 291 from the journey module 206 and transmits the journey data 291 to the estimation module 208.

The location module 204 can include code and routines for determining a current location of a user at a current time. In some implementations, the location module 204 can include a set of instructions executable by the processor 225 to provide the functionality described below for determining the current location of the user at the current time. In some implementations, the location module 204 can be stored in the memory 227 of the monitoring device 200 and can be accessible and executable by the processor 225. The location module 204 is coupled to the bus 220 via signal line 205.

In some implementations, the location module 204 receives sensor data 297 from sensors 235 that includes information about the location of the monitoring device 200. For example, the sensor data 297 may include GPS data that indicates the location of the monitoring device 200. The location module 204 may transmit the current location to the journey module 206 via the communication module 202 or store the current location as part of the journey data 291 in the memory 227.

The location module 204 may receive location information from the first client device 103 or the mobile client device 188. For example, the first client device 103 may be a smartwatch that tracks the user's runs.

The journey module 206 can include code and routines for generating journey data 291 and determining journey data 291 associated with the user, a current location, and/or a current time. In some implementations, the journey module 206 can include a set of instructions executable by the processor 225 to provide the functionality described below for generating journey data 291 and determining journey data 291. In some implementations, the journey module 206 can be stored in the memory 227 of the monitoring device 200 and can be accessible and executable by the processor 225. The journey module 206 is coupled to the bus 220 via signal line 207.

In some embodiments, the journey module 206 generates journey data 291 from historical journeys, which include locations visited by a user. For example, the journey module 206 may determine a journey that the user takes from home to work during the week, a journey that the user takes to get to the gym, a journey that the user takes to the grocery store on the weekends, etc. The journey module 206 may determine a most frequently taken journey based on time of day, driving data 293, etc. For example, the user may take a different journey to work at 9:00 a.m. than if the user left for work after rush hour has ended. In another example, the user may take a different journey to the gym based on the driving data 293 indicating that it is snowing.

The journey module 206 may determine journey data 291 associated with the user by determining the most frequent journey taken by the user based on the user's current location and the current time, which the journey module 206 may receive from the location module 204 via the communication module 202. Determining the journey data 291 may include determining an endpoint 101 for the journey. For example, the user may frequently use the same journey to go to the grocery store every Saturday. As a result, if the user is within a certain distance from the journey to the grocery store at a time when the user has previously traveled to the grocery store, the journey module 206 may determine that the user's current journey also includes the grocery store as the endpoint 101.

In some implementations, the journey module 206 generates a computational model based on the historical journey data 291 and predicts a current journey for the user based on the computational model. For example, the journey module 206 generates the computational model using a neural network, machine learning pattern matching, etc.

The estimation module 208 can include code and routines for determining an ETA and an ETD. In some implementations, the estimation module 208 can include a set of instructions executable by the processor 225 to provide the functionality described below for determining an ETA and an ETD. In some implementations, the estimation module 208 can be stored in the memory 227 of the monitoring device 200 and can be accessible and executable by the processor 225. The estimation module 208 is coupled to the bus 220 via signal line 209.

The estimation module 208 determines an ETA that describes an arrival estimate of when the user and the first client device 103 will arrive at an endpoint 101 of the journey. In some implementations, the estimation module 208 receives the journey data 291 from the journey module 206 or retrieves the journey data 291 from the memory 227 and determines the ETA based on the user's current location and one or more historical journeys. For example, the estimation module 208 determines that it typically takes the user 45 minutes to travel from the user's current location to the endpoint 101. The estimation module 208 may transmit the ETA to the network 105 via the communication module 202, which may include transmitting the ETA to a management application 102b at the endpoint 101 or a management application 102a stored on the management server 120.

In some implementations, the estimation module 208 determines an estimated time of departure (ETD) for a user at the endpoint 101. The ETD describes a departure estimate of when the user will depart from the endpoint 101 of the journey. For example, the estimation module 208 may determine that the user will be at the endpoint 101 for five minutes. This may occur if the user forgot something at the endpoint 101. In the above example, the estimation module 208 may determine the ETD based on the user traveling for ten minutes on a journey, such as a journey to work, and then turning around and returning to the endpoint 101.

The estimation module 208 may determine the ETD based on journey data 291. For example, if the user arrives at an endpoint at 9:30 a.m. on a weekday, the user typically stays at the endpoint until 12:30. In some implementations, if the user does something for which there is no journey data 291, the estimation module 208 may apply a default ETD. For example, if the user goes home in the middle of the day when the user is historically at work, the estimation module 208 determines a five minute ETD. The estimation module 208 may transmit the ETD to the network 105 via the communication module 202. The network 105 may transmit the ETD to the management application 102.

In some implementations, the management application 102 may use the ETA and/or the ETD to determine whether to perform one or more operations. For example, the house may be 10 degrees colder than the user prefers, but if the ETD is two minutes, the user might prefer to conserve energy more than the user prefers the endpoint 101 to be comfortable for the user for two minutes. Alternatively, if the ETD is greater than one hour, the management application 102 may determine to perform the operation. In some implementations the estimation module 208 performs the determination instead of the management application 102.

In some implementations, the estimation module 208 generates a score that indicates a likelihood that the user is arriving at the endpoint 101. The estimation module 208 may use different scales for the scoring, for example, from 1-10, 1-100, −10-0, etc. The estimation module 208 may convert the score into a likelihood that the user is arriving at the endpoint 101. For example, where the scale is from 1-10, a 2 indicates a 20% likelihood that the user is arriving at the endpoint 101.

The estimation module 208 may generate the score based on a comparison of the current location and the current time to the journey data 291. The estimation module 208 may also generate an updated score based on changes to the user's current location and the current time. For example, the journey module 206 may initially determine that the endpoint 101 is a restaurant and the estimation module 208 determines that there is a 75% likelihood that the user is traveling to the restaurant. The estimation module 208 may receive the user's current location and determine that the distance between the user's current location and the endpoint 101 increases. As a result, the estimation module 208 may generate a lower score and determine that there is a 15% likelihood that the user is traveling to the restaurant.

The estimation module 208 may use the score and/or the likelihood that the user is arriving at the endpoint 101 to determine a setting for an operation and generate an instruction that is transmitted to the network 105 via the communication module 202. The network 105 may transmit the score to the management application 102. In other implementations, the management application 102 receives the score and/or the likelihood from the estimation module 208 and uses the score and/or the likelihood to determine the setting for the operation. For example, the user may change a setting so that the management application 102 starts a water heater for making tea if a likelihood of a user arriving at an endpoint 101 is greater than 30%.

The estimation module 208 may transmit the score and/or the level of likelihood that the user is arriving at the endpoint 101 to the network 105 via the communication module 202. The network 105 may transmit the score and/or the level of likelihood to the management application 102, which may determine what operations to perform based on the score and/or the level of likelihood that the user is arriving at the endpoint 101. The management application 102 may include pre-installed protocols that indicate which operations should be performed based on the score and/or the level of likelihood. For example, the management application 102 may change the light setting if the likelihood that the user is arriving at the endpoint 101 is greater than 50% or the level is medium because the lights consume a low level of energy. In another example, the management application 102 may turn on the heat if the likelihood that the user is arriving at the endpoint 101 is greater than 75% or the level is high because the heat consumes enough energy that the threshold percentage for turning on the heat is 70%.

The driving module 210 can include code and routines for determining driving data 293 and determining whether the driving data 293 will alter the ETA or the ETD by a relevant amount. In some implementations, the driving module 210 can include a set of instructions executable by the processor 225 to provide the functionality described below for determining driving data 293 and determining whether the user data 295 will alter the ETA or the ETD. In some implementations, the driving module 210 can be stored in the memory 227 of the monitoring device 200 and can be accessible and executable by the processor 225. The driving module 210 is coupled to the bus 220 via signal line 213.

The driving data 293 may include one or more driving conditions that occur between the current location of the user and the endpoint 101 of the journey. For example, the driving data 293 may be based on traffic, weather conditions, and an indication that the endpoint of the journey is different.

The driving module 210 may receive the driving data 293 for the driving conditions between the current location and the endpoint 101 by retrieving the driving data 293 from the memory 227 or requesting the driving data 293 from the second server 198 and saving the driving data 293 in the memory 227. The driving data 293 from the second server 198 may include traffic data from a traffic server, weather conditions from a weather server, user information from a social network, etc.

In some implementations, the driving module 210 also determines driving data 293 based on the user's current location and whether it indicates that the endpoint 101 of the journey may have changed. For example, the journey module 206 determines the journey and the endpoint 101 based on the user, the current location, and the current time. The driving module 210 may compare the current location as the user travels to the journey to determine whether the user is still progressing towards the determined endpoint 101. In some implementations, the driving module 210 compares the distance between the current location and the endpoint 101. If the distance increases, or increases consistently for a certain amount of time, the driving module 210 determines that the endpoint 101 of the journey has changed.

The driving module 210 may estimate that the driving data 293 will alter the ETA or the ETD by a relevant amount. The relevant amount may be a default value, determined based on historical data, defined by the user, etc. For example, the relevant amount may be 5%, 10 minutes, etc. The driving module 210 determines that the driving data 293 alters the ETA, for example, when the endpoint 101 determined by the driving module 210 has changed from the initial endpoint 101 determined by the journey module 206. In another example, the driving module 210 determines that the driving data 293 alters the ETA, for example, when snow causes traffic to be slower than it takes to perform the historical journey. The driving module 210 may determine that the driving data 293 will alter the ETD, for example, if the ETA takes so long that it may overlap with an appointment, which shortens the ETD. The driving module 210 may transmit a revised ETA or a revised ETD to the network 105 via the communication module 202.

The user module 212 can include code and routines for receiving information about a user, generating user data 295, and determining whether the user data 295 will alter the ETA or the ETD. In some implementations, the user module 212 can include a set of instructions executable by the processor 225 to provide the functionality described below for receiving information about the user, generating user data 295, and determining whether the user data 295 will alter the ETA or the ETD. In some implementations, the user module 212 can be stored in the memory 227 of the monitoring device 200 and can be accessible and executable by the processor 225. The user module 212 is coupled to the bus 220 via signal line 213.

The user module 212 may register a user. For example, the user module 212 may associate the user with a username and password and generate user data 295 that includes the username, the password, and any attributes associated with the user. In some instances, the user module 212 generates user data 295 from information received from the second server 198. For example, the user module 212 may receive search terms or a browser history associated with the user. In another example, the user module 212 receives calendar data from a calendar server.

The user module 212 determines whether the user data 295 will alter the ETA or the ETD. For example, if the user recently used search terms that included a nearby store or searched for driving directions to a particular location, the user module 212 may determine that the endpoint 101 has changed from the initial endpoint 101 determined by the journey module 206. As a result, the user module 212 may determines that the ETA will be different because the user is traveling to a different endpoint 101. In another example, the user data 295 may include a calendar entry about an appointment that occurs thirty minutes after the user is scheduled to arrive at the endpoint 101, where the location of the appointment is ten minutes from the endpoint 101. The user module 212 may determine that the user will not stay longer than 20 minutes at the endpoint.

The user module 212 may apply a weight to the user data 295 based on the type of device used. For example, the user module 212 may use a weight that is more indicative of information used to determine an endpoint 101 when the user submits search terms on the mobile client device 188. The weight may be even more indicative of information used to determine the endpoint 101 when the mobile client device 188 is a smartwatch. Conversely, the user module 212 may apply a weight that is less indicative of information used to determine the endpoint 101 when the user submits search terms on a desktop computer because the desktop computer could be used by anyone in the household.

If the user module 212 determines that the user data 295 alters the ETA or the ETD, the user module 212 may transmit a revised ETA or a revised ETD to the network 105. In some implementations, the user module 212 transmits the revised ETA or the revised ETD if the revised ETA or the revised ETD differ by a predetermined amount. For example, the user module 212 transmits the revised ETA if it is more than 5% different from an original ETA.

In some implementations, the user module 212 determines a state of mind associated with the user. The state of mind may be associated with contextual data. For example, the user module 212 may determine that the user is sleepy if the user is leaving work at 10 p.m. instead of the historical time of 6 p.m. The user module 212 may transmit the state of mind to the network 105 via the communication module 202, which transmits the state of mind to the management application 102. The management application 102 may determine which operations to perform and what settings correspond to the operations based on the state of mind. For example, a sleepy user may prefer to have soothing music playing on the stereo when the user arrives at home. In some implementations, the user module 212 determines settings and operations to perform at the endpoint 101.

In some implementations, the user module 212 may use vehicle data 299 to determine a state of mind associated with the user. The user module 212 may receive the vehicle data 299 from the vehicle module 214 or retrieve the vehicle data 299 from the memory 227. In one example, the user module 212 determines that the user is in an agitated state based on the user driving faster than is indicated by historical vehicle data 299. The vehicle data 299 may also indicate that the user is leaving less room between the first client device 103 and other vehicles as compared to historical vehicle data 299. The user module 212 (or the management application 102) may determine to start heating water for tea to help calm the user.

The vehicle module 214 can include code and routines for receiving sensor data 297 from the sensors 235 in the first client device 103 and determining vehicle conditions. In some implementations, the vehicle module 214 can include a set of instructions executable by the processor 225 to provide the functionality described below for receiving sensor data 297 from the sensors 235 in the first client device 103 and determining vehicle conditions. In some implementations, the vehicle module 214 can be stored in the memory 227 of the monitoring device 200 and can be accessible and executable by the processor 225. The vehicle module 214 is coupled to the bus 220 via signal line 215.

In some implementations, the vehicle module 214 receives the sensor data 297 from the sensors 235 via the communication module 202. The vehicle module 214 determines vehicle conditions based on the sensor data 297. For example, the sensor 235 may include an interior thermometer that provides a temperature reading. The vehicle module 214 may determine the interior temperature of the first client device 103 based on the temperature reading. The vehicle module 214 may transmit the vehicle condition to the network 105 via the communication module 202. The network 105 may transmit the vehicle condition to the management application 102, which may create conditions at the endpoint 101 that are similar to the vehicle conditions. For example, the management application 102 may instruct a heater to heat the endpoint 101 to a temperature within a few degrees of the temperature in the first client device 103. In another example, the management application 102 may instruct a stereo to play the next song on the user's playlist at the endpoint 101 with a volume that is within a few decibels of the volume in the first client device 103.

The vehicle module 214 saves the vehicle conditions as vehicle data 299. In some implementations, the vehicle module 214 generates historical vehicle data 299 that the modules of the monitoring application 199 may use. For example, the user module 212 may determine the user's state of mind and use the vehicle data 299 to compare the current vehicle conditions to historical vehicle conditions to determine whether any of the vehicle conditions should be changed to match the historical vehicle conditions. In another example, the estimation module 208 may use vehicle data 299 to modify the ETA. For example, if the vehicle data 299 includes an almost empty gas gauge, the estimation module 208 may determine that the first client device 103 will need to stop for gas before reaching the endpoint 101. The estimation module 208 may add ten minutes to the ETA based on an average time it takes the user to fill up at a gas station.

The user interface module 216 can include code and routines for generating graphical data for providing user interfaces. In some implementations, the user interface module 216 can include a set of instructions executable by the processor 225 to provide the functionality described below for generating graphical data for providing user interfaces. In some implementations, the user interface module 216 can be stored in the memory 227 of the monitoring device 200 and can be accessible and executable by the processor 225. The user interface module 216 is coupled to the bus 220 via signal line 217.

In some implementations, the user interface module 216 receives instructions from the user module 212 to generate graphical data for displaying a user interface that the user may use for inputting user information. For example, the user interface module 216 may receive user input and transmit the user input via the communication module 202 to the user module 212 for registering a user. In some instances, the user input may include information for associating data from a second server 198 with the user module 212. For example, the user module 212 receives data from a calendar program, an email program, a social network, etc.

In some implementations, the user interface module 216 may generate a user interface for the user to configure instructions that are transmitted to the management application 102. For example, a default instruction may instruct the management application 102 to turn the air conditioning to a medium setting if there is at least a 75% chance that the user is arriving at the endpoint 101. The user may react strongly to warm temperatures and change the default instruction to turn the air conditioning on a high setting if there is at least a 75% chance that the user is arriving at the endpoint 101.

Example User Interface

Figure 3:
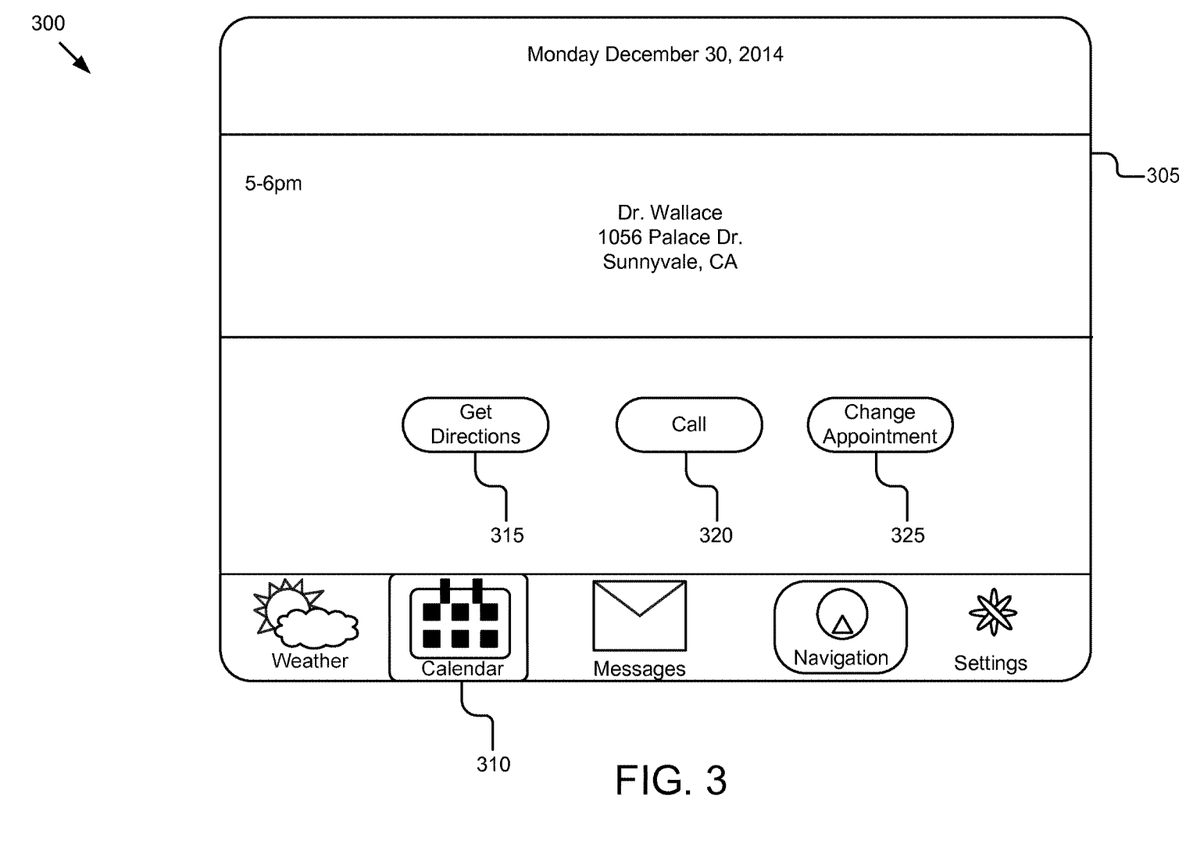
FIG. 3 is a graphic representation of an example user interface for associating calendar information with the monitoring application.

FIG. 3 is a graphic representation of an example user interface 300 for associating calendar information with the monitoring application 199. The user interface 300 includes a screen 305 generated by the user interface module 216 and icons that, when selected, provide screens for viewing information about the weather, calendar information, e-mail messages, vehicle navigation, and system settings. In this example, the "Calendar" icon 310 is selected. The "Calendar" icon provides information that includes the date of the appointment, the time of the appointment, and the location of the appointment. The screen 305 includes a "Get Directions" icon 315 that, when selected, causes the user interface module 216 to display driving directions to the location of the appointment. The screen 305 also includes a "Call" icon 320 that, when selected, causes the user interface module 216 to transmit instructions to the communication unit 237 via the communication module 202 to call the phone number associated with the appointment. Lastly, the screen includes a "Change Appointment" icon 325 that, when selected, causes the user interface module 216 to transmit an e-mail to an e-mail address associated with the appointment to request a different appointment time.

Example Methods

Figure 4:
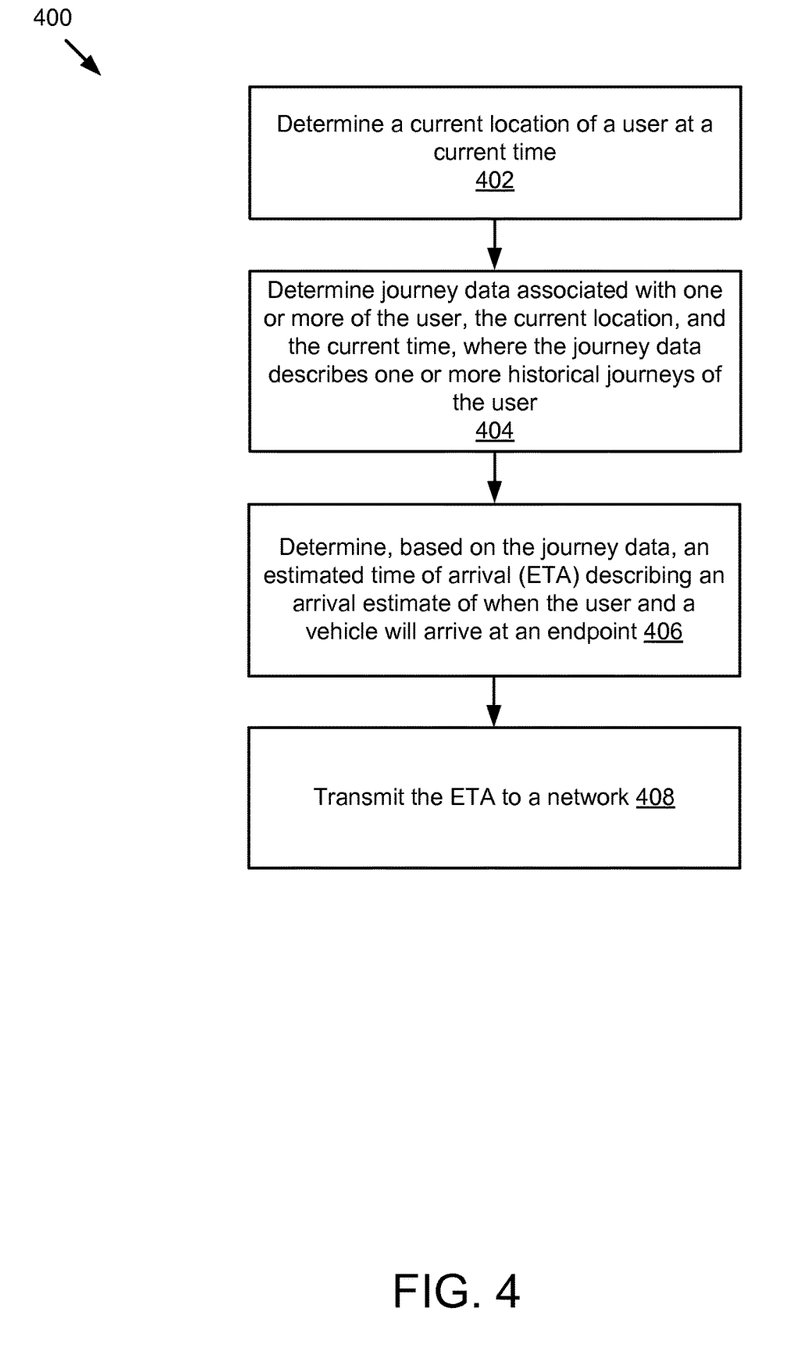
FIG. 4 is a flowchart of an example method for determining an ETA of a vehicle at an endpoint of a journey.

FIG. 4 is a flowchart of an example method for determining an ETA of a vehicle at an endpoint of a journey. In some implementations, the method 400 may be performed by modules of the monitoring application 199 stored on the first client device 103 or the mobile client device 188 of FIG. 1, or the monitoring device 200 of FIG. 2. For example, the monitoring application 199 may include the location module 204, the journey module 206, and the communication unit 237 of FIG. 2.

At block 402, a current location of a user at a current time may be determined. For example, the user may be driving on a highway at 1:00 p.m. on a weekday. The location module 204 may determine the current location of the user at the current time.

At block 404, journey data associated with one or more of the user, the current location, and the current time may be determined, where the journey data describes one or more historical journeys of the user. For example, the user historically travels to a restaurant at noon to eat lunch, the user did not visit a restaurant on this day, and the user's current location is five miles from a sandwich shop that the user visits at least once a week. The journey module 206 may determine journey data 291 associated with one or more of the user, the current location, and the current time.

At block 406, based on the journey data, an ETA may be determined describing an arrival estimate of when the user and a vehicle will arrive at an endpoint. For example, the journey data may include a journey that the user typically travels where it takes 12 minutes to reach the endpoint. The estimation module 208 may determine, based on the journey data 291, the ETA describing the arrival estimate of when the user and the vehicle will arrive at the endpoint 101 of FIG. 1. The vehicle may be the first client device 103 of FIG. 1. In some implementations, steps 402, 404, and 406 are repeated to confirm that the user is continuing to travel to the same endpoint and that the ETA is about the same as initially determined.

At block 408, the ETA may be transmitted to a network. The communication unit 237 may transmit the ETA to the network 105. The network 105 may transmit the ETA to the management application 102, which may be stored on the management server 120 or at the endpoint 101 of FIG. 1.

Figure 5:
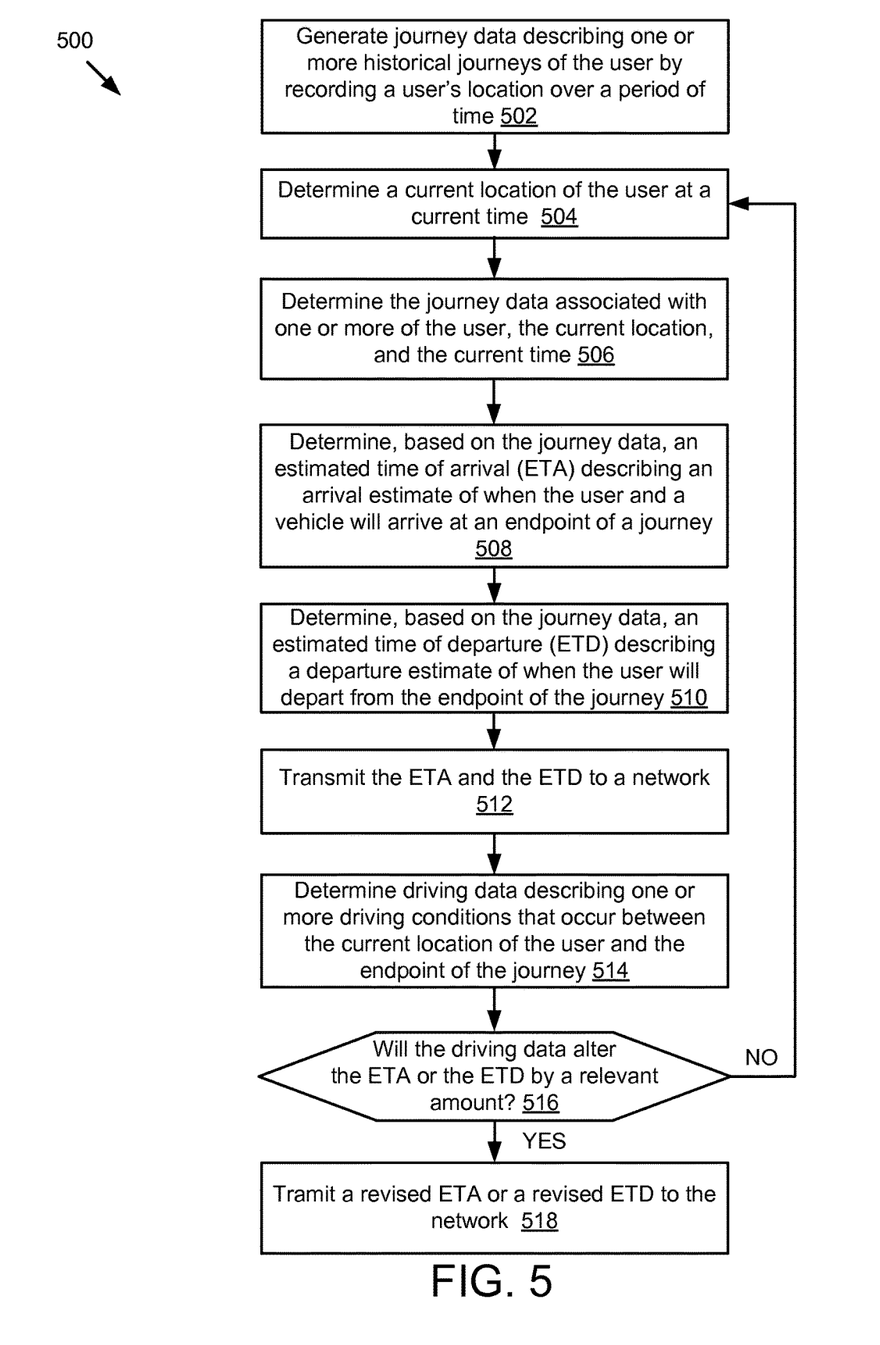
FIG. 5 is a flowchart of an example method for determining an ETA and an estimated time of departure of a vehicle at an endpoint of a journey.

FIG. 5 is a flowchart of an example method 500 for determining an ETA and an ETA of a vehicle at an endpoint of a journey. In some implementations, the method 500 may be performed by modules of the monitoring application 199 stored on the first client device 103 or the mobile client device 188 of FIG. 1, or the monitoring device 200 of FIG. 2. For example, the monitoring application 199 may include the location module 204, the journey module 206, the driving module 210, and the communication unit 237 of FIG. 2.

At block 502, journey data may be generated describing one or more historical journeys of the user by recording a user's location over a period of time. For example, the journey data may include the user's travel from home to work, from work to restaurants, from work to the gym, etc.

The location module 204 may determine the user's location and the journey module 206 may generate journey data 291 describing the one or more historical journeys of the user by recording the user's location over the period of time.

At block 504, a current location of the user at a current time may be determined. For example, the current location may be on route 92 in Half Moon Bay, Calif. at 5:30 p.m. The location module 204 may determine the current location of the user at the current time.

At block 506, the journey data associated with one or more of the user, the current location, and the current time may be determined. For example, the journey data may include historical journey data about how the user typically travels from work to home five days a week on a route that includes the user's current location at the user's current time. The journey module 206 may determine the journey data 291 associated with one or more of the user, the current location, and the current time.

At block 508, based on the journey data, an ETA may be determined that describes an arrival estimate of when the user and a vehicle will arrive at an endpoint of a journey. For example, the endpoint may be the user's home and the ETA may be 5:56. The estimation module 208 may determine, based on the journey data 291, the ETA describing the arrival estimate of when the user and the vehicle will arrive at the endpoint of the journey.

At block 510, based on the journey data, an ETD may be determined that describes a departure estimate of when the user will depart from the endpoint of the journey. For example, once the user returns home during the week, the user typically stays at home until 6:30 the next morning. The estimation module 208 may determine, based on the journey data 291, the ETD describing the departure estimate of when the user will depart from the endpoint of the journey.

At block 512, the ETA and the ETD may be transmitted to the network. The communication unit 237 may transmit the ETA and the ETD to the network 105 of FIG. 1.

At block 514, driving data may be determined describing one or more driving conditions that occur between the current location of the user and the endpoint of the journey. For example, the driving data may include traffic reports about how snow is currently causing a delay on route 92. The driving module 210 may determine driving data 293 describing one or more driving conditions that occur between the current location of the user and the endpoint of the journey.

At block 516, it is determined whether the driving data will alter the ETA or the ETD by a relevant amount. For example, it may be determined that it will take 50% longer for the user to reach home because of the snow than it historically takes the user to drive home from the user's current location. The determination of relevancy may be based on a default value or a value provided by the user. The driving module 210 may determine whether the driving data 293 will alter the ETA or the ETD a relevant amount.

Responsive to the driving data failing to alter the ETA or the ETD by the relevant amount, the next block is 504. Responsive to the driving data altering the ETA or the ETD the relevant amount, the next block is 518. At block 518, a revised ETA or a revised ETD is transmitted to the network. For example, the 50% change in the ETA is transmitted to the network. The communication unit 237 may transmit the revised ETA or the revised ETD.

Figure 6:
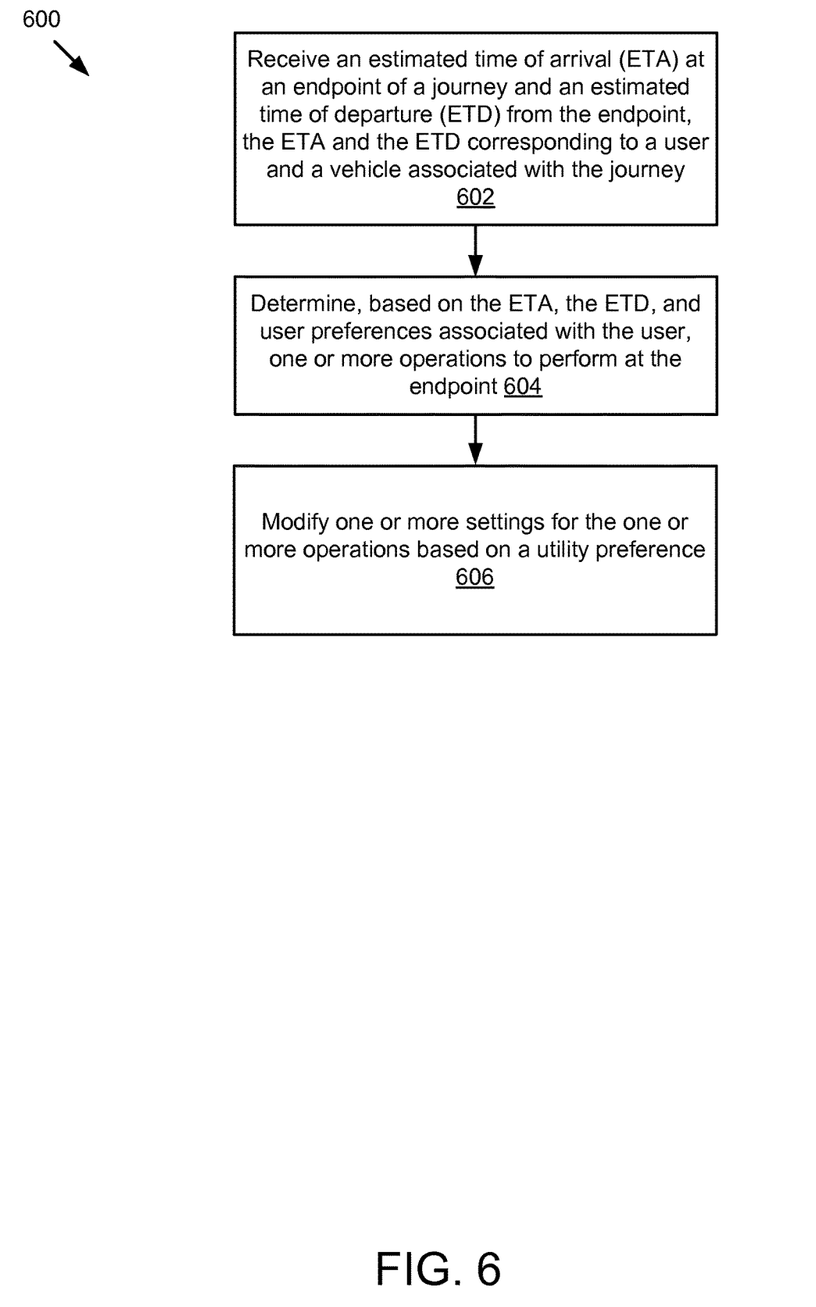
FIG. 6 is a flowchart of an example method for determining one or more operations to perform at an endpoint.

FIG. 6 is a flowchart of an example method 600 for determining one or more operations to perform at an endpoint. In some implementations, the method 600 may be performed by modules of the management application 102 stored on the endpoint 101 or the management server 120.

At block 602, an ETA at an endpoint of a journey and an ETD from the endpoint are received, the ETA and the ETD corresponding to a user and a vehicle associated with the journey. For example, the ETA is six minutes and the ETD is four hours. The management application 102 may receive the ETA and the ETD.

At block 604, based on the ETA, the ETD, and user preferences associated with the user, one or more operations to perform at the endpoint are determined. For example, it is determined that the user prefers the temperature to be 75 degrees Fahrenheit and since the user is staying for four hours, the heat should be turned on. The management application 102 may determine, based on the ETA, the ETD, and user preferences, the one or more operations to perform at the endpoint.

At block 606, one or more settings may be modified for the one or more operations based on a utility preference. For example, the utility preference may be to save energy costs, which results in changing the temperature to 72 degrees Fahrenheit. The management application 102 may modify the one or more settings for the one or more operations based on the utility preference.

The implementations of the specification can also relate to an apparatus for performing the operations described herein. This apparatus may be specially constructed for the required purposes, or it may include a special-purpose computer selectively activated or reconfigured by a computer program stored in the computer. Such a computer program may be stored in a non-transitory computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations, or some implementations containing both hardware and software elements. In some implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those that practice the art of computer programming. Additionally, the disclosure is in no way limited to implementations in any specific programming language, or for any specific operating system or environment. Accordingly, the disclosure is intended to be illustrative, but not limiting, of the scope of the specification, which is set forth in the following claims.

What is claimed is:

1. A method comprising:
    receiving sensor data from sensors in a vehicle;
    determining, by one or more processors, a current location of a user at a current time based on the sensor data;
    determining, by the one or more processors, journey data associated with the user based on the current location and the current time, wherein the journey data describes one or more historical journeys of the user;
    determining, by the one or more processors, based on the journey data, an estimated time of arrival (ETA) at an endpoint, the ETA describing an arrival estimate of when the user and the vehicle will arrive at the endpoint of a journey of the vehicle;
    determining, by the one or more processors, based on the journey data, an estimated time of departure (ETD) describing a departure estimate of when the user will depart from the endpoint of the journey;
    transmitting, by the one or more processors, the ETA and the ETD to a network, wherein the ETA and the ETD are received by a management device at the endpoint and the management device determines, based on a user preference associated with the user and a difference between the ETA and the ETD, one or more operations to perform at the endpoint;
    determining, by the one or more processors, whether a user action will alter the ETA or the ETD; and
    responsive to determining that the user action alters the ETA or the ETD, transmitting, by the one or more processors, a first revised ETA or a first revised ETD to the network, wherein the management device revises the one or more operations to perform at the endpoint based on the first revised ETA or the first revised ETD.

2. The method of claim 1, wherein the user action includes a recent request from the user for driving directions to a particular location.

3. The method of claim 1, further comprising:
    determining driving data describing one or more driving conditions that occur between the current location of the user and the endpoint of the journey;
    determining whether the driving data will alter the ETA or the ETD by a relevant amount; and
    responsive to the driving data altering the ETA or the ETD by the relevant amount, transmitting a second revised ETA or a second revised ETD to the network.

4. The method of claim 3, wherein the driving data is based on at least one of traffic, weather conditions, and an indication that the endpoint of the journey has changed.

5. The method of claim 1, wherein the user action includes a recent request from the user for information about a particular location.

6. The method of claim 1, further comprising transmitting the current location of the user to the network.

7. The method of claim 1, further comprising:
    determining a state of mind associated with the user; and
    transmitting the state of mind to the network.

8. The method of claim 1, further comprising:
    determining vehicle conditions based on the sensor data; and
    transmitting the vehicle conditions to the network, wherein the network provides the vehicle conditions to a management application to determine operations to create endpoint conditions that are similar to the vehicle conditions.

9. The method of claim 1, wherein the endpoint is a home associated with the user.

10. The method of claim 1, wherein the current location of the user is determined based on location data wirelessly received from a mobile device.

11. The method of claim 10, wherein the mobile device is selected from a group consisting of a smartphone, a smartwatch, a fitness tracker, a tablet computer, a personal computer, a laptop, and a personal digital assistant.

12. The method of claim 1, further comprising generating a score that indicates a likelihood that the user is arriving at the endpoint based on the current location and a comparison of the current location and the current time to the journey data.

13. The method of claim 12, further comprising, responsive to the score exceeding a predetermined threshold, transmitting a communication for the management device that indicates that the endpoint for the journey is a home associated with the management device.

14. The method of claim 1, further comprising generating the journey data by recording the user's location over a period of time.

15. A non-transitory computer-readable medium having computer instructions stored thereon that are executable by a processing device to perform or control performance of steps comprising:
  receiving sensor data from sensors in a vehicle;
  determining a current location of a user at a current time based on the sensor data;
  determining journey data associated with the user based on the current location and the current time, wherein the journey data describes one or more historical journeys of the user;
  determining based on the journey data, an estimated time of arrival (ETA) at an endpoint, the ETA describing an arrival estimate of when the user and the vehicle will arrive at the endpoint of a journey;
  determining based on the journey data, an estimated time of departure (ETD) describing a departure estimate of when the user will depart from the endpoint of the journey;
  transmitting the ETA and the ETD to a network, wherein the ETA and the ETD are received by a management device at the endpoint and the management device determines, based on a user preference associated with a user and a difference between the ETA and the ETD, one or more operations to perform at the endpoint;
  determining whether a user action will alter the ETA or the ETD; and
  responsive to determining that the user action alters the ETA or the ETD, transmitting a first revised ETA or a first revised ETD to the network, wherein the management device revises the one or more operations to perform at the endpoint based on the first revised ETA or the first revised ETD.

16. The non-transitory computer-readable medium of claim 15, wherein the user action includes a recent request from the user for driving directions to a particular location.

17. The non-transitory computer-readable medium of claim 15, the steps further comprising:
  determining driving data describing one or more driving conditions that occur between the current location of the user and the endpoint of the journey;
  determining whether the driving data will alter the ETA or the ETD by a relevant amount; and
  responsive to the driving data altering the ETA or the ETD by the relevant amount, transmitting a second revised ETA or a second revised ETD to the network.

18. The non-transitory computer-readable medium of claim 17, wherein the driving data is based on at least one of traffic, weather conditions, and an indication that the endpoint of the journey has changed.

19. The non-transitory computer-readable medium of claim 15, wherein the user action includes a recent request from the user for information about a particular location.

20. The non-transitory computer-readable medium of claim 15, the steps further comprising transmitting the current location of the user to the network.

21. The non-transitory computer-readable medium of claim 15, the steps further comprising:
  determining a state of mind associated with the user; and
  transmitting the state of mind to the network.

22. The non-transitory computer-readable medium of claim 15, the steps further comprising:
  determining vehicle conditions based on the sensor data; and
  transmitting the vehicle conditions to the network, wherein the network provides the vehicle conditions to a management application to determine operations to create endpoint conditions that are similar to the vehicle conditions.

23. The non-transitory computer-readable medium of claim 15, wherein the endpoint is a home associated with the user.

24. The non-transitory computer-readable medium of claim 15, the steps further comprising generating a score that indicates a likelihood that the user is arriving at the endpoint based on the current location and a comparison of the current location and the current time to the journey data.

25. The non-transitory computer-readable medium of claim 24, the steps further comprising, responsive to the score exceeding a predetermined threshold, transmitting a communication for the management device that indicates that the endpoint for the journey is a home associated with the management device.

26. The non-transitory computer-readable medium of claim 15, the steps further comprising generating the journey data by recording the user's location over a period of time.

27. A method comprising:
  receiving, by one or more processors, an estimated time of arrival (ETA) at an endpoint of a journey and an estimated time of departure (ETD) from the endpoint, the ETA and the ETD corresponding to a user and a vehicle associated with the journey;
  determining, by the one or more processors, based on a user preference associated with the user and a difference between the ETA and the ETD, one or more operations to perform at the endpoint;
  receiving, by the one or more processors, a revised ETA or a revised ETD based on user actions associated with the user that will alter the ETA or the ETD;
  revising, by the one or more processors, the one or more operations to perform at the endpoint based on the revised ETA or the revised ETD;
  modifying, by the one or more processors, one or more settings for the one or more operations based on a utility preference; and
  performing, the one or more operations by at least one of a thermostat, an oven, a boiler, a rice cooker, a yogurt maker, a coffee maker, a water heater, a home security system, a lighting system, a stereo system, an entertainment system, and a garage door opener.

* * * * *